United States Patent [19]

Patel et al.

[11] Patent Number: 5,149,774
[45] Date of Patent: Sep. 22, 1992

[54] METHOD FOR RECYCLING DISCOLORED POLYOLEFINS

[75] Inventors: Ambelal R. Patel, Ardsley, N.Y.; Stephen D. Pastor, Danbury, Conn.

[73] Assignee: Ciba-Geigy Corporation, Ardsley, N.Y.

[21] Appl. No.: 560,689

[22] Filed: Jul. 31, 1990

[51] Int. Cl.$^5$ .............................................. C08F 8/32
[52] U.S. Cl. ................................... 528/492; 525/259; 525/379; 521/47
[58] Field of Search ................ 528/492; 525/379, 259; 521/47

[56] References Cited

U.S. PATENT DOCUMENTS 3,310,541  3/1967  Breuers et al. ..................... 528/492
4,590,231  5/1986  Seltzer et al. ..................... 524/100
4,876,300  10/1989  Seltzer et al. .

Primary Examiner—Joseph L. Schofer
Assistant Examiner—Tom Weber
Attorney, Agent, or Firm—Luther A. R. Hall

[57] ABSTRACT

Polyolefins, especially those containing a phenolic antioxidant, are prone to discoloration upon improper processing at elevated temperatures or upon prolonged aging. Such discolored polyolefins can be reclaimed and recycled as essentially non-colored useful polymers by the addition thereto of a hydroxylamine of the formula $$T_1T_2NOH$$

where $T_1$ and $T_2$ are independently alkyl, cycloalkyl, benzyl or substituted benzyl.

13 Claims, No Drawings

METHOD FOR RECYCLING DISCOLORED POLYOLEFINS

BACKGROUND OF THE INVENTION

While polyolefins have achieved phenomenal economic success, they are in many aspects fragile polymers which require a variety of stabilizers or stabilizer mixtures to protect them from thermal, oxidative and actinic degradation. Such stabilizers include inter alia the phenolic antioxidants, the hindered amine stabilizers, the ultraviolet light absorbers, the organic phosphorous process stabilizers, alkaline metal salts of fatty acids and thiosynergists.

Although phenolic antioxidants have long been known to be very effective stabilizers for polyolefins and have enjoyed wide commercial success for that use, polyolefin compositions stabilized with phenolic antioxidants tend to discolor upon heating at elevated temperatures for prolonged periods or upon exposure to the combustion products of natural gas.

While the concomitant addition of organic phosphites to such polyolefin compositions mitigates the discoloration, it remains a serious practical problem. While the addition of phosphites is useful in preventing the discoloration of virgin polyolefins, which are not yet discolored, organic phosphites are not useful in reducing the color of polyolefins already discolored.

Likewise polyolefin compositions containing certain phenolic antioxidants and hindered amine light stabilizers tend to discolor upon storage for extended periods even at ambient temperatures.

As is described in U.S. Pat. No. 4,590,231, the concomitant use of a selected hydroxylamine, in addition to whatever other stabilizers are indicated, stabilized the polyolefin against degradation and discoloration upon exposure to heating at elevated temperatures, to the combustion products of natural gas, to gamma irradiation or to prolonged storage at ambient temperature.

U.S. Pat. No. 4,876,300 discloses that long chain N,N-dialkylhydroxylamines in the absence of any other stabilizers provide excellent process stabilization for polyolefin compositions both in regard to resistance to discoloration and to thermal degradation.

While these effects are certainly valuable and important, the polyolefins involved are virgin polymers which had not been previously processed, properly or improperly, nor had they been previously discolored by whatever method. Thus, these prior art references are silent as to whether hydroxylamines would be useful in the recycling of polyolefins, already discolored and/or degraded by improper processing at elevated temperatures or by prolonged aging, into products of sufficiently low color to make said products acceptable for practical use in the marketplace.

It is expected that increasing economic and environmental concerns about reducing the mountains of used waste polymers, including polyoolefins, will cause any method found feasible to recycle and reuse said used polymers to assume increasing importance in the future.

DETAILED DISCLOSURE

The instant invention pertains to a method for reclaiming and recycling an already discolored polyolefin resin, which is discolored as a result of improper processing at a too elevated temperature or of prolonged aging, which method comprises incorporating into said discolored polyolefin resin an effective color reducing amount of a hydroxylamine of formula I $$T_1T_2NOH$$

wherein $T_1$ and $T_2$ are independently hydrogen, alkyl of 1 to 36 carbon atoms, cycloalkyl of 5 to 12 carbon atoms, aralkyl of 7 to 15 carbon atoms or said aralkyl substituted by alkyl of 1 to 18 carbon atoms or α-cumyl, with the proviso that $T_1$ and $T_2$ are not both hydrogen, and reprocessing the discolored polyolefin resin, now containing said hydroxylamine of formula I, to yield a reclaimed and recycled polyolefin resin with sufficiently reduced color to make said reprocessed polyolefin acceptable for reuse.

The polyolefin of the instant invention is a homopolymer or copolymer of an alpha-olefin.

The polyolefins useful in the instant invention are the polymers derived from nonoolefins, such as polyethylene, which can also be crosslinked, polypropylene, polyisobutylene, polybutene-1, poly-3-methylbutene-1 and poly-4-methylpentene-1. Polyethylene may be, for example, medium density, high density or linear low density polyethylene.

Mixtures of the homopolymers cited above, for example, mixtures of polypropylene and polyethylene, polypropylene amd polybutene-1, or polypropylene and polyisobutylene and the like, may also be used.

Copolymers of monoolefins may also be used in the instant process, for example, ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

Especially preferred polyolefin substrates are polypropylene, low density polyethtylene, medium density polyethylene, high density polyethylene, linear low density polyethylene, poly(butene-1), ethylene/vinyl acetate copolymer, ethylene/propylene copolymer and copolymers of ethylene or of propylene with higher alpha-olefins.

The most preferred polyolefins are polypropylene, high density polyethylene, ethylene/propylene copolymer or a copolymer of ethylene or of propylene with another alpha-olefin, low density polyethylene or linear low density polyethylene. Particularly preferred is polypropylene.

The hydroxylamines of formula I are known compounds and many are commercially available. In other cases the requisite amine intermediates are commercially available.

The hydroxylamines are conveniently prepared from the corresponding amine by oxidation with a peroxy compound such as hydrogen peroxide followed by reduction of the oxyl intermediate formed to the desired hydroxylamine; by reacting hydroxylamine or a substituted hydroxylamine with an activated halogen compound in the presence of an acid acceptor, or by reducing the oxime of a cyclic ketone to the corresponding hydroxylamine.

In the hydroxylamines of formula I, $T_1$ and $T_2$ are independently alkyl of 1 to 36 carbon atoms, such as for example, methyl, ethyl, isobutyl, tert-butyl, n-octyl, n-dodecyl, n-tetradecyl, n-hexadecyl, n-octadecyl, eicosyl or triacontyl. Perferably $T_1$ and $T_2$, when independently alkyl, are alkyl of 4 to 18 carbon atoms, most preferably 12 to 18 carbon atoms such as dodecyl, tetradecyl, hexadecyl, heptadecyl or octadecyl. Most preferably $T_1$ and $T_2$ are each n-octadecyl or are alkyl mixture found in hydrogenated tallow amine, such as described in U.S. Pat. No. 4,876,300.

$T_1$ and $T_2$ may also be independently cycloalkyl of 5 to 12 carbon atoms such as, for example, cyclopentyl, cyclohexyl, cyclooctyl or cyclododecyl; preferably cyclohexyl; or where $T_1$ is hydrogen and $T_2$ is cyclohexyl.

$T_1$ and $T_2$ may also be aralkyl of 7 to 15 carbon atoms or substituted aralkyl such as, for example, benzyl, alpha-methylbenzyl, alpha-dimethylbenzyl where the benzyl may be additionally substituted by alkyl, preferably methyl, dodecyl or apha-cumyl. Preferably said aralkyl is benzyl.

In general, the hydroxylamine of formula I is employed from about 0.01 to about 5% by weight based on the weight of the polyolefin to be reclaimed and recycled. The exact amount will depend upon the particular polyolefin being reclaimed and the degree of discoloration to be reduced. Preferably about 0.05 to about 2%, most preferably about 0.1 to about 1% by weight of the hydroxylamine is used based on the weight of the discolored polyolefin being reclaimed.

The hydroxylamine of formula I may be incorporated into the polyolefin to be reclaimed by conventional techniques. For example, the hydroxykamine may be mixed with the polymer in dry powder form, or may be solvent blended onto the polyolefin to be reclaimed followed by removal of the solvent, typically methylene chloride, by evaporation.

As described above, the instant discolored polyolefin which is to be reclaimed and recycled will certainly also contain one or more stabilizers and/or additives, some of which may have contributed to the discoloration which is to be reduced by the instant process.

Typical examples of such stabilizers additives are seen below.

1. Antioxidants 1.1. Alkylated monophenols, for example, 2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-butylphenol
2,6-di-cyclopentyl-4-methylphenol
2-(α-methylcyclohexyl)-4,6-dimethylphenol
2,6-di-octadecyl-4-methylphenol
2,4,6-tri-cyclohexylphenol
2,6-di-tert-butyl-4-methoxymethylphenol 1.2. Alkylated hydroquinones, for example, 2,6-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated thiodiphenyl ethers, for example, 2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-bisphenols, for example, 2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl-butane
2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane
ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl]terephthalate.

1.5. Benzyl compounds, for example, 1,3,5-tri-(3,5-di-tert-butyl-4-hydroxybenzyl)-2,4,6-trimethylbenzene
di-(3,5-di-tert-butyl-4-hydroxybenzyl)sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl)isocyanurate
1,3,5-tris-(4-tert-butyl-3-hydroxy-2,6-dimethylbenzyl)isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for example, 4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of
β-(3,5-di-tert-butyl-4-hydroxyphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.8. Esters of
β-(5-tert-butyl-4-hydroxy-3-methylphenyl)-propionic acid with monohydric or polyhydric alcohols, for example,

| | |
|---|---|
| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |

1.9. Amides of
β-(3,5-di-tert-butyl-4-hydroxyphenyl)-propionic acid for example, N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine 2. UV absorbers and light stabilizers 2.1. 2-(2'-Hydroxyphenyl)-benzotriazoles, for example, the 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy, 3',5'-di-tert-amyl-, 3',5'-bis-(α,α-dimethylbenzyl), 3'-tert-butyl-5'-(2-(omega-hydroxy-octa-(ethyleneoxy)carbonyl-ethyl)-, 3'-dodecyl-5'-methyl-, and 3'-tert-butyl-5'-(2-octyloxycarbonyl)ethyl-, and dodecylated-5'-methyl derivatives.

2.2. 2-Hydroxy-benzophenones, for example, the 4-hydroxy-, 4-methoxy-, 4-octoxy, 4-decyloxy-, 4-dodecyloxy-, 4-benzyloxy-, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyl-dithiocarbamate, nickel salts of 4-hydroxy-3,5-di-tert-butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazole, optionally with additional ligands.

2.6. Sterically hindered amines, for example bis-(2,2,6,6-tetramethylpiperidyl)sebacate, bis-(1,2,2,6,6-pentamethylpiperidyl)sebacate, n-butyl-3,5-di-tert.butyl-4-hydroxybenzyl malonic acid bis-(1,2,2,6,6-pentanemethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid, 1,1'(1,2-ethanediyl)-bis-(3,3,5,5-tetramethylpiperazinone).

2.7. Oxalic acid diamides, for example, 4,4'-dioctyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho-and para-methoxy- as well as of o- and p-ethoxy-disubstituted oxanilides.

2.8. Hydroxyphenyl-s-triazines, for example 2,6-bis-(2,4-dimethylphenyl)-4-(2-hydroxy-4-octyloxyphenyl)-s-triazine; 2,6-bis-(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxyethoxy)phenyl]-6-(4-chlorophenyl)-s-triazine; 2,4-bis[2-hydroxy-4-(2-hydroxy-4-(2-hydroxyethoxy)-phenyl]-6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydroxyphenylpropionyl)hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecylpentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(β-dodecylmercapto)-propionate.

6. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

7. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-heptadecylnitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, 4-tert-butyl-benzoic acid, adipic acid, diphenylacetic acid.

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, plasticizers, lubricants, emulsifiers, pigments, optical brighteners, flame-proofing agents, anti-static agents, blowing agents and thiosynergists such as dilauryl thiodipropionate or distearyl thiodipropionate.

The following examples are presented for the purpose of illustration only and are not to be construed to limit the nature or scope of the instant invention in any manner whatsoever.

EXAMPLE 1

This example illustrates the use of N,N-dibenzylhydroxylamine in reducing the color of processed polypropylene which following processing exhibits an unacceptable level of discoloration. The addition of the hydroxylamine to the discolored polypropylene followed by reprocessing produced a reprocessed polypropylene of a sufficiently reduced color, as measured by yellowness index (YI) to be acceptably for color, as measured by yellowness index (YI) to be acceptably for end-use applications.

The base polymer comprises unstabilized polypropylene (PROFAX 6501, Himont) containing 0.1% by weight of calcium stearate. The phenolic antioxidant and later the hydroxylamine stabilizers are added by solvent blending onto the propylene from solutions in methylene chloride. After removal of the solvent by evaporation under reduced pressure, the stabilized polypropylene formulation is extruded at 100 rpm from a 1 inch (2.54 cm) extruder at 500° F. (260° C.).

After the indicated number of extrusions, the resin pellets are compression molded into 125 mil (3.2 mm) thick plaques at 380° F. (193° C.) and specimen yellowness index (YI) values are determined according to ASTM D-1925. Low YI values indicate less yellowing.

| Additive* (Conc. % by wt) | YI values after Extrusion | | |
|---|---|---|---|
| | 1 | 3 | 5 |
| Base Formulation | 3.6 | 4.2 | 4.8 |
| AO A (0.1) | 8.0 | 10.9 | 13.5 |

N,N-Dibenzylhydroxyamine (HA 1) is added to the AO A formulation as indicated below and further extrusions are carried out and the YI values determined

| Additive* (Conc % by wt) | YI values after Extrusion | | | | | |
|---|---|---|---|---|---|---|
| | 1 | 2 | 3 | 4 | 5 | 6 |
| AO A (0.1) plus HA 1 (0.05) added after 1st extrusion | 8.0 | 5.8 | 5.7 | 6.3 | 6.4 | — |
| AO A (0.1) plus HA 1 (0.05) added after 3rd extrusion | 8.0 | — | 10.9 | 7.2 | 7.3 | 7.3 |

*Base formulation contains 0.1% by weight calcium stearate.
AO A is neopentanetetrayl tetrakis(3,5-di-tert-butyl-4-hydroxyhydrocinnamate).
HA 1 is N,N-dibenzylhydroxylamine.

The YI values are the averages of two replicates.

It is clear that the addition of the N,N-dibenzylhydroxylamine to the already severely discolored polypropylene/phenolic antioxidant formulation after the first or third extrusion reverses the severe discoloration and arrests any additional development of color even after further multiple extrusions.

EXAMPLE 2

Following the procedure set forth in Example 1, N,N-dibenzylhydroxylamine is replaced by a long chain N,N-dialkylhydroxylamine derived from hydrogenated tallow amine. The alkyl groups in the mixture are largely n-hexadecyl, n-heptadecyl and n-octadecyl. The major components are N,N-di-hexadecylhydroxylamine, N-hexadecyl-N-octadecylhydroxylamine and N,N-di-octadecylhydroxylamine.

This substituted hydroxyamine (HA 2) is added to the AO A formulation as indicated below and further extrusions are carried out and the YI values determined.

| Additive* (Conc % by wt) | YI values after Extrusion | | | | | |
|---|---|---|---|---|---|---|
| | 1 | 2 | 3 | 4 | 5 | 6 |
| Base formulation plus AO A (0.1) | 4.8 | 5.0 | 5.2 | 6.0 | 6.1 | 6.3 |
| AO A (0.1) plus HA 2 (0.05) added after 2nd extrusion | 4.9 | 5.0 | 2.7 | 2.8 | 2.9 | 3.0 |
| AO A (0.1) plus HA 2 (0.05) added after 3rd extrusion | 4.8 | 5.0 | 5.2 | — | 3.0 | 3.0 |
| AO A (0.1) plus HA 2 (0.05) added after 4th extrusion | 4.7 | 4.8 | 4.7 | 6.0 | 3.0 | 3.0 |
| AO A (0.1) plus HA 2 (0.05) together before extrusion | 1.1 | 1.3 | 1.5 | 1.7 | 2.2 | 2.1 |

*Base formulation contains 0.1% by weight calcium stearate.
AO A is neopentanetetrayl tetrakis(3,5-di-tert-butyl-4-hydroxyhydrocinnamate).
HA 2 is the long chain N,N-dialkylhydroxylamine derived from hydrogenated tallow amine.

The YI values are the averages of two replicates.

It is clear that the addition of the N,N-dibenzylhydroxylamine to the already severely discolored polypropylene/phenolic antioxidant formulation after the second, third or fourth extrusion reverses the severe discoloration and arrests any additional development of color even after further multiple extrusions.

These experiments demonstrate that already discolored polyolefins can be reclaimed and reused as reprocessed polyolefin with sufficiently reduced color to make it acceptable for use in a wide variety of end-use applications by the judicious incorporation of a substituted hydroxylamine. This promises to be one potential way to reduce the enormous amount of used waste polyolefin now accumulating as an environmental concern.

What is claimed is:

1. A method for reclaiming and recycling an already discolored polyolefin resin, which is discolored as a result of improper processing at a too elevated temperature or of prolonged aging, which method comprises incorporating into said discolored polyolefin resin an effective color reducing amount of a hydroxylamine of formula I $T_1T_2NOH$ wherein $T_1$ and $T_2$ are independently hydrogen, alkyl of 1 to 36 carbon atoms, cycloalkyl of 5 to 12 carbons atoms, aralkyl of 7 to 15 carbon atoms or said aralkyl substituted by alkyl of 1 to 18 carbon atoms or by α-cumyl, with the proviso that $T_1$ and $T_2$ are not both hydrogen, and reprocessing the discolored polyolefin resin, now containing said hydroxylamine of formula I, to yield a reclaimed and recycled polyolefin resin with sufficiently reduced color to make said reprocessed polyolefin acceptable for reuse.

2. A method according to claim 1 wherein the polyolefin is a homopolymer or copolymer of an alpha-olefin.

3. A method according to claim 2 wherein the polyolefin is selected from the group consisting of polypropylene, low density polyethylene, medium density polyethylene, high density polyethylene, linear low density polyethylene, poly(butene-1), ethylene/vinyl acetate copolymer, ethylene/propylene copolymer, and copolymers of ethylene or of propylene with other alpha-olefins.

4. A method accoring to claim 3 wherein the polyolefin is polypropylene, high density polyethylene, ethylene/propylene copolymer or a copolymer of ethylene or of propylene with other alpha-olefins.

5. A method according to claim 4 wherein the polyolefin is propylene.

6. A method according to claim 1 wherein $T_1$ and $T_2$ are each benzyl.

7. A method according to claim 1 wherein $T_1$ and $T_2$ are independently alkyl of 12 to 18 carbon atoms.

8. A method according to claim 1 wherein $T_1$ and $T_2$ are the alkyl mixture found in hydrogenated tallow amine.

9. A method according to claim 1 wherein $T_1$ is hydrogen and $T_2$ is cyclohexyl.

10. A method according to claim 1 wherein $T_1$ and $T_2$ are each n-octadecyl.

11. A method according to claim 1 wherein the effective color reducing amount of hydroxylamine of formula I is 0.01 to 5% by weight based on the weight of the discolored polyolefin to be reclaimed.

12. A method according to claim 11 wherein the effective amount of hydroxylamine of formula I is 0.05 to 2% by weight.

13. A method according to claim 12 wherein the effective amount of hydroxylamine of formula I is 0.1 to 1% by weight.

* * * * *